United States Patent
Uka et al.

(10) Patent No.: US 10,340,090 B2
(45) Date of Patent: Jul. 2, 2019

(54) ELECTROLYTIC CAPACITOR, AND PRODUCTION METHOD THEREFOR

(71) Applicant: Panasonic Corporation, Osaka (JP)

(72) Inventors: Youichirou Uka, Osaka (JP); Shintaro Tanimoto, Osaka (JP); Hiroshi Kojima, Aichi (JP)

(73) Assignee: PANASONIC CORPORATION, Oaska (JP)

( * ) Notice: Subject to any disclaimer, the term of this patent is extended or adjusted under 35 U.S.C. 154(b) by 0 days.

(21) Appl. No.: 15/375,078

(22) Filed: Dec. 9, 2016

(65) Prior Publication Data

US 2017/0092429 A1 Mar. 30, 2017

Related U.S. Application Data

(63) Continuation of application No. PCT/JP2015/003129, filed on Jun. 23, 2015.

(30) Foreign Application Priority Data

Jun. 26, 2014 (JP) ................................ 2014-131557

(51) Int. Cl.
*H01G 9/02* (2006.01)
*H01G 9/048* (2006.01)
*H01G 9/028* (2006.01)
*H01G 9/00* (2006.01)

(52) U.S. Cl.
CPC ........... *H01G 9/028* (2013.01); *H01G 9/0036* (2013.01); *H01G 9/048* (2013.01)

(58) Field of Classification Search
CPC ....... H01G 9/028; H01G 9/0036; H01G 9/048

USPC ......................................................... 361/527
See application file for complete search history.

(56) References Cited

U.S. PATENT DOCUMENTS

2012/0057275 A1    3/2012   Intelmann et al.

FOREIGN PATENT DOCUMENTS

| CN | 101840790 A | * | 9/2010 |
| JP | 2012-517113 |   | 7/2012 |
| JP | 2014-086473 |   | 5/2014 |
| JP | 2014086473 A | * | 5/2014 |
| JP | 2014086473 A | * | 5/2014 |

OTHER PUBLICATIONS

International Search Report of PCT application No. PCT/JP2015/003129 dated Sep. 8, 2015.

* cited by examiner

*Primary Examiner* — Michael P McFadden
(74) *Attorney, Agent, or Firm* — McDermott Will & Emery LLP

(57) ABSTRACT

An electrolytic capacitor includes: an anode body; a dielectric layer formed on the anode body; a first conductive polymer layer covering at least a part of the dielectric layer; a second conductive polymer layer covering at least a part of the first conductive polymer layer; and an intermediate layer formed between the first conductive polymer layer and second conductive polymer layer. The intermediate layer includes a cation agent containing a cationic group, and an anion agent containing a first anionic group and a second anionic group. The first anionic group is higher in electron-withdrawing property than the second anionic group. In the intermediate layer, a total of a number of the first anionic group and a number of the second anionic group is larger than a number of the cationic group.

28 Claims, 1 Drawing Sheet

ELECTROLYTIC CAPACITOR, AND PRODUCTION METHOD THEREFOR

RELATED APPLICATIONS

This application is a Continuation of International Application No. PCT/JP2015/003129, filed on Jun. 23, 2015, which in turn claims priority from Japanese Patent Application No. 2014-131557, filed on Jun. 26, 2014, the contents of all of which are incorporated herein by reference in their entireties.

BACKGROUND

1. Technical Field

The present disclosure relates to an electrolytic capacitor having a conductive polymer layer, and a production method therefor.

2. Description of the Related Art

In recent years, with a decrease in the size and the weight of electronic instruments, small-sized and large-capacitance capacitors for high frequencies have been desired. As such capacitors, developments have been advanced about electrolytic capacitors small equivalent series resistance (ESR) and excellent in frequency properties. Electrolytic capacitors each include an anode body including a valve metal such as tantalum, niobium, titanium or aluminum, a dielectric layer formed on the anode body, and a cathode body. Out of these electrolytic capacitors, the following are also called solid electrolytic capacitors: electrolytic capacitors in each of which a conductive polymer layer containing a conductive polymer layer (solid electrolytic layer) is formed as a cathode member on a dielectric layer.

In order to heighten strength of the conductive polymer layer, investigations have been made about the use of a crosslinking agent when the conductive polymer layer is formed. For example, according to Japanese Translation No. 2012-517113 of PCT Publication, a conductive polymer layer (polymer outer layer) is formed by: forming a solid electrolytic layer containing a conductive polymer; immersing this layer into a solution containing a crosslinking agent and then drying the layer; and immersing the layer into a liquid dispersion containing a conductive polymer and then drying the layer. According to Japanese Translation No. 2012-517113 of PCT Publication, in order to restrain the conductive polymer layer of a capacitor element from being peeled off and make the conductive polymer layer high in performance of covering terminal portions of the capacitor element, the crosslinking agent is used before the formation of the polymer outer layer, as described above.

SUMMARY

An electrolytic capacitor of an aspect in the present disclosure includes an anode body; a dielectric layer formed on the anode body; a first conductive polymer layer covering at least a part of the dielectric layer; a second conductive polymer layer covering at least a part of the first conductive polymer layer; and an intermediate layer formed between the first conductive polymer layer and the second conductive polymer layer. The intermediate layer includes a cation agent containing a cationic group, and an anion agent containing a first anionic group and a second anionic group. The first anionic group is higher in electron-withdrawing property than the second anionic group. In the intermediate layer, a total of a number of the first anionic group and a number of the second anionic group is larger than a number of the cationic group.

A method of another aspect in the present disclosure for producing an electrolytic capacitor includes: preparing an anode body; forming a dielectric layer on the anode body; treating the anode body, in which the dielectric layer is formed, with a first treating liquid including a first conductive polymer; treating the anode body, which is treated with the first treating liquid, with a second treating liquid including a cation agent containing a cationic group, and an anion agent containing a first anionic group and a second anionic group; and treating the anode body, which is treated with the second treating liquid, with a third treating liquid including a second conductive polymer. The first anionic group is higher in electron-withdrawing property than the second anionic group. A total of a number of the first anionic group and a number of the second anionic group is larger than a number of the cationic group.

The present disclosure can provide an electrolytic capacitor that is decreased in ESR and further restrained from being increased in leakage current; and a production method therefor.

DETAILED DESCRIPTION OF EMBODIMENT

Figure 1:
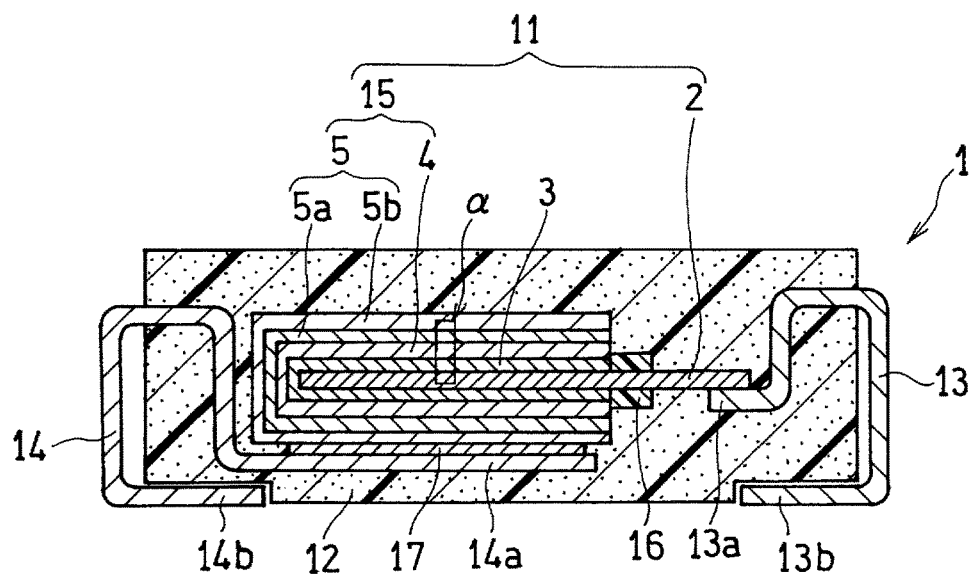
FIG. 1 is a schematic sectional view of an electrolytic capacitor according to an exemplary embodiment in the present disclosure.

Even when the crosslinking agent described in Japanese Translation No. 2012-517113 of PCT Publication is used, the upper of the solid electrolytic layer cannot be sufficiently covered with the conductive polymer layer (polymer outer layer), so that the electrolytic capacitor cannot be decreased in ESR, and may be increased in leakage current.

Thus, the present disclosure provides a technique making it possible that in an electrolytic capacitor having a conductive polymer layer, the ESR thereof is decreased and further a leakage current therefrom is restrained from being increased.

Referring appropriately to the drawings, the following will describe an exemplary embodiment of an electrolytic capacitor and a method for producing an electrolytic capacitor in the present disclosure.

<<Electrolytic Capacitor>>

An electrolytic capacitor of an exemplary embodiment in the present disclosure includes an anode body; a dielectric layer formed on the anode body; a first conductive polymer layer covering at least a part of the dielectric layer; a second conductive polymer layer covering at least a part of the first conductive polymer layer; and an intermediate layer formed between the first conductive polymer layer and the second conductive polymer layer. The intermediate layer includes a cation agent containing a cationic group, and an anion agent containing a first anionic group and a second anionic group. The first anionic group is higher in electron-withdrawing property than the second anionic group. In the intermediate layer, a total of a number of the first anionic group and a number of the second anionic group is larger than a number of the cationic group.

The first conductive polymer layer and the second conductive polymer layer usually each contain an anionic dopant together with a conductive polymer. This dopant is easily present in respective surfaces of the first conductive polymer layer and the second conductive polymer layer. In other words, a surface of each of the first conductive polymer layer and the second conductive polymer layer is easily electrified into minus charge, so that the second conductive polymer layer is not easily formed onto the surface of the first conductive polymer layer. According to an exemplary embodiment in the present disclosure, the formation of the cation-agent-including intermediate layer makes it possible to heighten the second conductive polymer layer in formability and/or covering performance. Moreover, the use of the anion agent makes it possible to heighten a cover-repairing performance of the dielectric layer.

In order to gain the advantageous effect of the cation agent sufficiently, it is required to make the cation agent into a sufficiently dissociated state in a treating liquid for forming the intermediate layer. However, the cation agent is low in solubility and further high in volatility; thus, it is difficult to increase the content of the cation agent in the intermediate layer. In the meantime, by causing the anion agent together with the cation agent to make the number of the anionic groups larger than that of the cationic group(s), the dissociation of the cation agent can be stably promoted. However, if the electron-withdrawing property of the anionic groups of the anion agent is excessively high, a valve metal constituting the anode body corrodes easily. When the treating liquid for forming the intermediate layer is substantially neutral, the cation agent volatilizes easily.

According to an exemplary embodiment in the present disclosure, the anion agent contains the first anionic group(s) high in electron-withdrawing property. This matter makes it possible to heighten the cation agent in dissociatability and solubility in the treating liquid for forming the intermediate layer. In the intermediate layer, the total of the number of the first anionic group(s) and that of the second anionic group(s) is made larger than the number of the cationic group(s). In this way, the volatilization of the cation agent can be restrained. Thus, the cationic group(s) can be efficiently disposed onto the first conductive polymer layer so that the second conductive polymer layer can be heightened in formability and/or covering performance to decrease ESR of the electrolytic capacitor. Furthermore, the anion agent contains the second anionic group(s) lower in electron-withdrawing property than the first anionic group(s). This matter makes it possible to restrain the valve metal constituting the anode body from being corroded, and restrain an increase in a leakage current of the electrolytic capacitor. Moreover, in the intermediate layer, the total of the respective numbers of the first anionic group(s) and the second anionic group(s) is made larger than the number of the cationic group(s). In this way, the cover-repairing effect of the dielectric layer can be heightened to improve voltage resistant characteristics of the electrolytic capacitor.

Figure 2:
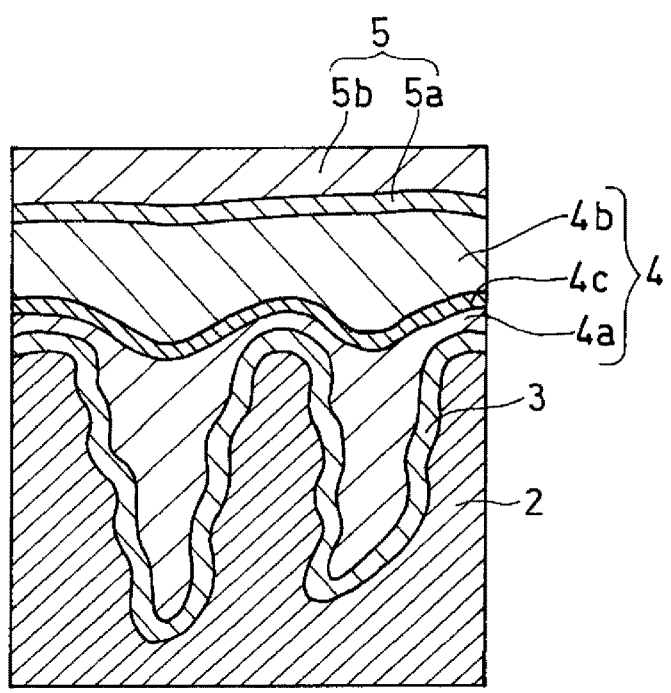
FIG. 2 is an enlarged view of a region surrounded by a solid line a in FIG. 1.

FIG. 1 is a schematic sectional view of the electrolytic capacitor according to an exemplary embodiment in the present disclosure. FIG. 2 is an enlarged view of a region surrounded by a solid line α of FIG. 1. Electrolytic capacitor 1 has capacitor element 11, resin outer package 12 for sealing the capacitor element 11, and anode terminal 13 and cathode electrode 14 each made naked outside resin outer package 12. Capacitor element 11 includes anode body 2 (or anode portion) in a foil-piece or plate shape, dielectric layer 3 covering a one-end-portion side of anode body 2, and cathode portion (cathode member) 15 covering dielectric layer 3. Anode terminal 13 is electrically connected to anode body 2, and cathode terminal 14 is electrically connected to cathode portion 15. Resin outer package 12 has a substantially rectangular parallelepiped external shape. By this matter, electrolytic capacitor 1 also has a substantially rectangular parallelepiped external shape.

Anode body 2 and cathode portion 15 are opposed to each other across dielectric layer 3. Cathode portion 15 has conductive polymer layer 4 covering dielectric layer 3, and cathode layer 5 covering conductive polymer layer 4. Cathode layer 5 illustrated has a bilayered structure, and has carbon layer 5a contacting conductive polymer layer 4, and silver paste layer 5b covering the surface of carbon layer 5a.

In the other end portion of anode body 2 that is projected from cathode portion 15, and a cathode-portion-15-side region of this end portion, insulating separation portion 16 is formed to cover surfaces of anode body 2 into a band form, so that contact between cathode portion 15 and anode body 2 is restricted. The other end portion of anode body 2, which is projected from cathode portion 15, is electrically connected to first end portion 13a of anode terminal 13 by, e.g., welding. Cathode layer 5 formed as the outermost layer of cathode portion 15 is electrically connected to first end portion 14a of cathode terminal 14 through conductive adhesive material 17 (such as a mixture of a thermosetting resin and metallic particles). Second end portion 13b of anode terminal 13, and second end portion 14b of cathode terminal 14 are pulled out, respectively, from different side-surfaces of resin outer package 12 to be extended in a naked state to one of the main flat surfaces of the electrolytic capacitor (the lower surface of the electrolytic capacitor in FIG. 1). In this flat surface, a position where each of the terminals is naked is used for connection with a substrate (not illustrated) on which electrolytic capacitor 1 is to be mounted, using, e.g., a solder.

Dielectric layer 3 is formed on a part of a surface of the conductive material constituting anode body 2. Specifically, dielectric layer 3 can be formed by anodizing the surface(s) of the conductive material constituting anode body 2. As illustrated in FIG. 2, therefore, dielectric layer 3 is formed along the surface(s) (including internal wall surfaces of holes or pits made in the surface(s)) of anode body 2.

First conductive polymer layer 4a is formed to cover dielectric layer 3, and second conductive polymer layer 4b is formed to cover first conductive polymer layer 4a. Intermediate layer 4c is formed between first conductive polymer layer 4a and second conductive polymer layer 4b. In the illustrated example, intermediate layer 4c is formed to cover first conductive polymer layer 4a, and second conductive polymer layer 4b is formed to cover intermediate layer 4c.

It is not necessarily that first conductive polymer layer 4a covers the whole (the entire surface) of dielectric layer 3. It is sufficient that first conductive polymer layer 4a is formed to cover at least a part of dielectric layer 3. It is desired that first conductive polymer layer 4a is formed to cover regions of dielectric layer 3 as large as possible. In the same way, it is not necessarily essential that second conductive polymer layer 4b and intermediate layer 4c each covers the whole (the entire surfaces) of first conductive polymer layer 4a. It is sufficient that second conductive polymer layer 4b is formed to cover at least a part of first conductive polymer layer 4a. It is desired that second conductive polymer layer 4b is formed to cover regions of conductive polymer layer 4a as large as possible. In the illustrated example, first conductive polymer layer 4a, second conductive polymer layer 4b and intermediate layer 4c have been illustrated as conductive polymer layer 4. In general, however, conductive-polymer-containing layers, such as first conductive polymer layer 4a, second conductive polymer layer 4b and conductive polymer layer 4, may each be called a solid electrolytic layer.

Since dielectric layer 3 is formed along the surfaces of anode body 2, irregularities are made in the surfaces of dielectric layer 3 in accordance with the shape of the surfaces of anode body 2. First conductive polymer layer 4a is formed preferably to embed the irregularities of dielectric layer 3 into first conductive polymer layer 4a.

In the above-mentioned structure, anode body 2 is an anode member of capacitor element 11 while first conductive polymer layer 4a, second conductive polymer layer 4b and cathode layer 5 are a cathode member of capacitor element 11. Dielectric layer 3 is a dielectric member of capacitor element 11.

Hereinafter, the structure of the electrolytic capacitor will be described in more detail.

<Anode Body>

For the anode body, a conductive material of large surface area is usable. Examples of the conductive material include valve metals, alloys each containing a valve metal, and compounds each containing a valve metal. These materials may be used singly or in any combination of two or more thereof. The valve metal(s) may be preferably, for example, titanium, tantalum, aluminum and/or niobium. Not only these metals but also respective oxides of the metals are high in dielectric constant to be each suitable for a constituent material of the anode body. The anode body is, for example, a body obtained by roughening one or more surfaces of a substrate (such as a substrate in the shape of, e.g., a foil-piece or plate) made of a conductive material; or a shaped body or sintered body of particles of a conductive material.

<Dielectric Layer>

The dielectric layer can be formed by anodizing the conductive material of the surface(s) of the anode body by, e.g., anodizing treatment. Thus, the dielectric layer includes an oxide of the conductive material (in particular, a valve metal). When, for example, tantalum is used as the valve metal, the dielectric layer contains $Ta_2O_5$. When aluminum is used as the valve metal, the dielectric layer contains $Al_2O_3$. The dielectric layer is not limited to such dielectric layers. Thus, the dielectric layer may be any layer as far as the layer functions as a dielectric. When the anode body is in the shape of a foil-piece or plate and the surface(s) of the anode body is/are roughened, the dielectric layer is formed, as illustrated in FIG. 2, along internal wall surfaces of holes or pits made in the surface(s) of anode body 2.

<First Conductive Polymer Layer>

It is sufficient for the first conductive polymer layer to be formed to cover at least a part of the dielectric layer. This first conductive polymer layer may be formed to cover the whole of one or more surfaces of the dielectric layer. The first conductive polymer layer includes a first conductive polymer. The first conductive polymer layer further includes a dopant. The dopant may be included in the first conductive polymer layer in a state that this layer is doped with the dopant. The dopant may be included in the first conductive polymer layer in a state that the dopant is bonded to the first conductive polymer.

<First Conductive Polymer>

The first conductive polymer may be a known conductive polymer usable for an electrolytic capacitor, and is, for example, a π-conjugated conductive polymer. The conductive polymer is, for example, a polymer having, as a basic skeleton thereof, a polypyrrole, a polythiophene, a polyfuran, a polyaniline, a polyacetylene, a polyphenylene, a polyphenylenevinylene, a polyacene, and/or a polythiophenevinylene.

The polymer may be a homopolymer, or a copolymer made from two or more monomers, or any derivative (such as a substituted body having a substituent) of the homopolymer or copolymer. For example, the polythiophene is, for example, poly(3,4-ethylenedioxythiophene). Such conductive polymers are high in conductivity, and excellent in ESR property. The conductive polymers may be used singly or in any combination of two or more thereof. The weight-average molecular weight of the conductive polymers is not particularly limited, and is, for example, from 1,000 to 1,000,000 both inclusive.

<Dopant>

The dopant may be, for example, a low molecular weight compound having an acidic group (or an anionic group) (referred to also as a low molecular type dopant), or a polymer compound (referred to also as a high molecular type dopant). The use of the high molecular type dopant makes it possible to form a more homogeneous first conductive polymer layer. Dopants may be used singly, or in any combination of two or more thereof.

The low molecular type dopant may be, for example, one or more compounds (each) having an anionic group, such as a sulfonate group, a carboxyl group, a phosphate group (—O—P(═O)(—OH)$_2$), and/or a phosphonate group (—P(═O)(—OH)$_2$). This compound may be, for example, a cyclic compound in which an anionic group is bonded to an aromatic ring (such as a $C_{6-14}$ aromatic ring), e.g., benzene, naphthalene or anthracene, or to a condensed ring made from an aromatic ring (such as a $C_{6-14}$ aromatic ring) and an aliphatic ring. The anionic group is preferably a sulfonate group, and may be a combination of a sulfonate group with a group other than the sulfonate group. The aromatic ring and/or the aliphatic ring, which is/are included in the cyclic compound, may (each) have a substituent (such as an alkyl group such as a methyl group, or an oxo group (═O)) other than the anionic group. Specific examples of such a compound include alkylbenzenesulfonic acid, such as benzenesulfonic acid and p-toluenesulfonic acid; naphthalenesulfonic acid; and anthraquinonesulfonic acid.

The high molecular type dopant may be, for example, a polymer compound having one or more anionic groups, such as a sulfonate group, a phosphate group (—O—P(═O)(—OH)$_2$), and/or a phosphonate group (—P(═O)(—OH)$_2$). Among these anionic groups, a sulfonate group is preferred. The high molecular type dopant having a sulfonate group is, for example, a homopolymer or copolymer made from a monomer having a sulfonate group (for example, a vinyl monomer having a sulfonate group, or a diene monomer having a sulfonate group such as isoprenesulfonic acid). Examples of the vinyl monomer having a sulfonate group include aliphatic vinyl monomers each having a sulfonate group, such as vinylsulfonic acid, allylsulfonic acid, and 2-acrylamide-2-methylpropanesulfonic acid; and aromatic vinyl monomers each having a sulfonate group, such as styrenesulfonic acid. These vinyl monomers may be used singly or in any combination of two or more thereof. The copolymer may be a copolymer made from monomers having two or more sulfonate groups, respectively; or a copolymer made from a monomer having a sulfonate group, and another monomer. Examples of the high molecular type dopant also include polyestersulfonic acids, and/or phenolsulfonic acid novolak resins.

In each of the low molecular type dopant and the high molecular type dopant, the anionic group is not particularly limited as far as this group can produce an anion when the group is in a dissociated state. Thus, the anionic group may be, for example, any salt or ester of the anionic group.

The weight-average molecular weight of the high molecular type dopant is, for example, from 1,000 to 1,000,000 both inclusive, preferably from 10,000 to 500,000 both inclusive. The use of the high molecular type dopant having such a molecular weight makes it possible to make the first conductive polymer layer even more homogeneous. About the homopolymer and copolymer made from the monomer having a sulfonate group, the weight-average molecular weight is more preferably from 10,000 to 500,000 both inclusive. About polyestersulfonic acids and phenolsulfonic acid novolak resins, the weight-average molecular weight is more preferably from 5,000 to 80,000 both inclusive.

The amount of the dopant included in the first conductive polymer layer is preferably from 10 parts by mass to 1000 parts by mass both inclusive, more preferably from 50 parts by mass to 200 parts by mass both inclusive with respect to 100 parts by mass of the first conductive polymer.

The anode body has a large surface area, and the dielectric layer is formed not only onto the outer surface(s) of the anode body but also internal wall surfaces of holes and pits made in the surface(s) of the anode body. It is preferred to form the first conductive polymer layer also onto the dielectric layer formed on the internal wall surfaces to increase covering proportion of the first conductive polymer layer.

<Intermediate Layer>

It is sufficient for the intermediate layer to be formed to cover at least a part of the first conductive polymer layer. The intermediate layer may be formed to cover the whole of the surface(s) of the first conductive polymer layer. In one or more regions of electrolytic capacitor where the first conductive polymer layer is not formed, the intermediate layer may contact the dielectric layer (in other words, the intermediate layer may be formed to cover one or more regions of the dielectric layer).

<Cation Agent>

The intermediate layer includes a cation agent containing one or more cationic groups. The cation agent is not particularly limited as far as the cation agent can produce a cation when the agent is a dissociated state. The cation agent may be, for example, a metal compound (for example, an inorganic base such as a metal hydroxide), and is preferably an organic compound (for example, an organic base). The cationic group(s) of the cation agent, which is the organic compound, is/are (each) preferably an amino group (such as a primary, secondary or tertiary amino group), or a quarterly ammonium group. The cationic group(s) may (each) be, for example, a salt of an amino group, or a salt of a quarterly ammonium group.

Among such cation agents, preferred is a cation agent having one or more amino groups as the cationic group(s) (for example, an amine compound). The amine compound is, for example, an amine (any one of primary to ternary amines) having, on a nitrogen atom thereof, 1 to 3 substituents (such as an alkyl group, a cycloalkyl group and/or an aryl group); or a diamine which may have, on a nitrogen atom thereof, one or two alkyl groups.

Examples of the alkyl group, which the amine or the diamine has, include $C_{1-16}$ alkyl groups such as methyl, ethyl, 1-propyl, 2-propyl, 1-butyl, tert-butyl, hexyl, 2-ethylhexyl, octyl, decyl and dodecyl. The alkyl group may be in a linear or branched form. At least one alkyl group that the ammonium cation has preferably has a $C_{4-16}$ alkyl group (or a $C_{6-12}$ alkyl group or a $C_{6-10}$ alkyl group). A different alkyl group in each of the amine and the diamine may be a $C_{1-10}$ alkyl group (or a $C_{1-6}$ alkyl group or a $C_{1-4}$ alkyl group).

Examples of the cycloalkyl group include $C_{4-10}$ cycloalkyl groups (or $C_{5-8}$ cycloalkyl groups) such as cyclopentyl, cyclohexyl, and cyclooctyl. Examples of the aryl group include $C_{6-14}$ aryl groups such as phenyl and naphthyl. The alkyl group, the cycloalkyl group and the aryl group may each have one or more substituents such as a hydroxy group and/or an alkoxy group (such as a $C_{1-6}$ alkoxy group or a $C_{1-4}$ alkoxy group, such as methoxy or ethoxy).

Examples of the above-mentioned diamine include diaminoalkanes, diaminocycloalkanes (such as diamino $C_{5-8}$ cycloalkanes such as diaminocyclohexane), and diaminoarenes (such as diamino $C_{6-14}$ arenes such as diaminobenzene and diaminonaphthalene). These diamines may each have, on an alkane, cycloalkane or arene moiety thereof, one or more substituents such as a hydroxyl group and/or an alkoxy group (such as a $C_{1-6}$ alkoxy group or a $C_{1-4}$ alkoxyl group, such as methoxy or ethoxy).

Examples of the diaminoalkane include diamino $C_{2-14}$ alkanes (or diamino $C_{4-12}$ alkanes) such as 1,4-diaminobutane, 1,6-diaminohexane, 1,8-diaminooctane, and 1,10-diaminodecane. These diamines may have, on each of the nitrogen atoms thereof, one or two alkyl groups. Examples of the alkyl group(s) include the alkyl groups given above as examples. The alkyl group(s) may (each) be in a linear or branched form. The alkyl group(s) may (each) have one or more substituents such as a hydroxyl group and/or an alkoxy group (such as a $C_{1-6}$ alkoxyl group or a $C_{1-4}$ alkoxyl group, such as methoxy or ethoxy).

The amine may be a primary amine and/or a tertiary amine. Examples of the tertiary amine include N,N-di($C_{1-10}$alkyl)-N—($C_{4-16}$ alkyl)amines, N,N-di($C_{4-16}$ alkyl)-N—($C_{1-10}$ alkyl)amines, and tri($C_{4-16}$ alkyl)amines. The intermediate layer may include one cation agent, or a combination of two or more cation agents.

The intermediate layer may include the cation agent in any one of an amine compound form, an amine-compound-corresponding cation form, a quaternary ammonium compound form, and/or a cationic salt form. In the intermediate layer, for example, the cation agent may be combined with an anion agent to produce a salt.

<Anion Agent>

The anion agent is preferably an organic compound that can produce an anion when the compound is in a dissociated state. Examples of the anionic groups which the anion agent has include sulfonate, phosphate, phosphonate, borate, carboxyl, and hydroxyl groups. The anionic groups are each not particularly limited as far as the anionic group can produce an anion when the group is in a dissociated state. The anionic group may be, for example, a salt of each of the groups described just above. It is important that the anion agent contains one or more first anionic groups and one or more second anionic groups lower in electron-withdrawing property than the first anionic group(s). The first anionic group(s) and the second anionic group(s), the former(s) being different from the latter(s) in electron-withdrawing property, may be appropriately selected from anionic groups as described above.

In the intermediate layer, or a treating liquid for forming the intermediate layer, the anionic group(s) of the anion agent may (each) be included in any one of the form of the anionic group(s), the form of one or more anions corresponding to the anionic group(s), and the form of one or more salts of the anion(s). Thus, examples of, e.g., the sulfonate group also include a free sulfonic acid group (—$SO_3H$), a sulfonate anion (—$SO_3^-$), and sulfonate salts.

Example of the phosphate group include a free phosphoric acid group (—OP(=O)(OH)$_2$), phosphate anions (—OP$_3$H$^-$ and —OPO$_3{}^{2-}$), and phosphate salts. Examples of the phosphonate group include a free phosphonate group (—P(=O)(OH)$_2$), phosphonate anions (—PO$_3$H$^-$, and —PO$_3{}^{2-}$), and phosphonate salts. Examples of the carboxyl group include a free carboxyl group (—COOH), a carboxylate anion (—COO$^-$), and carbonate salts.

The first anionic group(s) is/are (each) preferably, among the above-mentioned anionic groups, a sulfonate, phosphate or phosphonate group (in particular, a sulfonate group). However, among the anionic groups included in the intermediate layer, or the treating liquid for forming the intermediate layer, one or more anionic groups highest in electron-withdrawing property are defined as the first anionic group(s).

The second anionic group(s) is/are (each) preferably at least one selected from phosphate group, phosphonate group, carboxyl group and hydroxyl group. However, the second anionic group(s) is/are lower in electron-withdrawing property than the first anionic group(s). The intermediate layer, or the treating liquid for forming the intermediate layer may contain one second anionic group, or two or more second anionic groups. The hydroxyl group may be an alcoholic hydroxyl group, and is preferably a phenolic hydroxyl group since this group is higher in electron-withdrawing property.

The anion agent may include a first anion agent having the first anionic group(s), and a second anion agent having the second anionic group(s). Moreover, the anion agent may contain a third anion agent having the first anionic group(s) and the second anionic group(s).

<First Anion Agent, and Second Anion Agent>

The first anion agent and the second anion agent may each be any one of an aliphatic compound, an alicyclic compound, and an aromatic compound. The aliphatic compound has one or more anionic groups, and an aliphatic moiety (for example, methane, ethane or any other alkane moiety (such as a $C_{1-6}$ alkane moiety)) bonded to (each of) the anionic group(s). The alicyclic compound has one or more anionic groups, and an alicyclic moiety (for example, cyclopentane, cyclohexane, or any other alicyclic moiety (such as a $C_{5-8}$ cycloalkane moiety)) bonded to (each of) the anionic group (s). The aromatic group has one or more anionic groups, and an aromatic moiety (for example, benzene, naphthalene, or any other arene moiety (such as a $C_{6-14}$ arene moiety)) bonded to (each of) the anionic group(s). The aliphatic moiety, the alicyclic moiety, and the aromatic moiety may each optionally have a substituent such as a halogen atom (such as a fluorine atom or a chlorine atom), an alkyl group (such as methyl, ethyl or any other $C_{1-4}$ alkyl group), or an alkenyl group (such as a vinyl group, or any other $C_{2-6}$ alkenyl group). The use of the first anion agent and/or the second anion agent (each) having an alicyclic moiety and an aromatic moiety (in particular, an aromatic moiety) heightens the affinity of the agent(s) with the first conductive polymer layer and/or the second conductive polymer layer. Consequently, when the second conductive polymer layer is formed, this layer can be made higher in formability and/or covering performance.

A number of the first anionic group(s) (or the second anionic group(s)) of the first anion agent (or the second anion agent) may be one or, two or more (such as two, three, or four). The second anion agent may contain one second anionic group, or two or more second anionic groups. Second anion agent equivalent to the second anion agent may be used singly or in any combination of two or more thereof.

Examples of the anion agent having one or more sulfonate groups as the anionic group(s) include aliphatic sulfonic acids (for example, $C_{1-6}$ alkanesulfonic acids, such as methanesulfonic acid), alicyclic sulfonic acids (for example, $C_{5-8}$ cycloalkanesulfonic acids, such as cyclohexanesulfonic acid), and aromatic sulfonic acids (for example, $C_{8-14}$ arenesulfonic acids, such as benzenesulfonic acid and styrenesulfonic acid).

Examples of the anion agent having one or more carboxyl groups as the anionic group(s) include aliphatic carboxylic acids (for example, $C_{2-10}$ alkanecarboxylic acids, such as propionic acid, butanoic acid and hexanoic acid, and $C_{4-12}$ alkanedicarboxylic acids, such as hexanoic diacid); alicyclic carboxylic acids (for example, carboxy $C_{5-8}$ cycloalkanes, such as carboxycyclohexane, and dicarboxy $C_{5-8}$ cycloalkanes, such as cyclohexanedicarboxylic acid); aromatic carboxylic acids (for example, carboxy $C_{6-14}$ arenes, such as benzoic acid, caroboxyhydroxy $C_{8-14}$ arenes such as salicylic acid, and dicarboxy $C_{8-14}$ arenes, such as phthalic acid, isophthalic acid, terephthalic acid, and naphthalene dicarboxylic acid).

Examples of the anion agent having one or more phosphonate groups as the anionic group(s) include aliphatic phosphonic acids such as vinylphosphonic acid, and aromatic phosphonic acids such as phenylphosphonic acid. Examples of the anion agent having one or more phosphate groups as the anionic group(s) include acid phosphoxy polyoxyalkylkene glycol monoacrylates of each carboxylic acid (acid phosphoxy polyoxyalkylkene glycol mono(meth)acrylates (P(=O)(OH)$_2$—(O—CH$_2$CH$_2$)$_n$—O—C(=O)—CR=CH$_2$ wherein n is an integer from 2 to 10, and R is a hydrogen atom or a methyl group)), such as acid phosphoxy ethyl acrylate, and acid phosphoxy ethyl methacrylate. The acid phosphoxy ethyl or any other acid phosphoxy alkyl group is an alkyl group having a phosphate group. Acrylate and methacrylate are generically called (meth)acrylate.

The first anion agent preferably has one or more sulfonate groups as the first anionic group(s). In order to heighten the electrolytic capacitor in voltage resistance, and/or further restrain a leakage current therefrom, the second anion agent preferably contains at least one of species selected from phosphate group and phosphonate group. The use of the first anion agent and the second anion agent makes it easy to adjust the ratio between the first anionic group(s) and the second anionic group(s) appropriately.

<Third Anion Agent>

The third anion agent, which has the first anionic group(s) and the second anionic group(s), may be a low molecular compound (monomer compound) or a high molecular compound (polymer). The third anion agent may contain one second anionic group, or may contain two or more second anionic groups.

The monomer compound may be any one of an aliphatic compound, an alicyclic compound and an aromatic compound. The aliphatic compound has an aliphatic moiety, and the first anionic group(s) and the second anionic group(s) each bonded to the aliphatic moiety. The alicyclic compound has an alicyclic moiety, and the first anionic group(s) and the second anionic group(s) each bonded to the alicyclic moiety. The aromatic compound has an aromatic moiety, and the first anionic group(s) and the second anionic group(s) each bonded to the aromatic moiety. The aliphatic moiety, the alicyclic moiety, and the aromatic moiety are each appropriately selectable from the examples given about the first anion agent and the second anion agent. In the third anion agent, a number of the first anionic group(s), as well as a number of the second anionic group(s), may be one, or two or more (such as two, three or four).

Examples of the monomer compound of the third anion agent having one or more sulfonate groups as the first anionic group(s) and one or more carboxyl groups as the second anionic group(s) include aliphatic compounds such as sulfosuccinic acid; and aromatic compounds such as sulfobenzoic acid, sulfosalicylic acid, sulfophthalic acid, sulfoisophthalic acid, sulfoterephthalic acid, and naphtholsulfonic acid. Such monomer compounds may be used singly or in any combination of two or more thereof. The monomer compound preferably contains one or more sulfonate groups as the first anionic group(s). In order to heighten the electrolytic capacitor in voltage resistance, and/or further restrain a leakage current therefrom, the monomer compound preferably contains, as the second anionic group(s), at least one of species selected from phosphate group and phosphonate group.

Examples of the polymer (high molecular compound) include a copolymer (c1) of monomer units each having one or more first anionic groups and monomer units each having one or more second anionic groups; and a polymer (c2) including monomer units each having one or more first anionic groups and one or more second anionic groups. The high molecular compound may include one or more monomer units (each) having the first anionic group(s). The high molecular compound may include one or more monomer units (each) having the second anionic group(s). The high molecular compound may include one or more monomer units (each) having the first anionic group(s) and the second anionic group(s). In each of the monomer units, a number of the first anionic group(s), as well as a number of the second anionic group(s), may be one or more. High molecular compounds equivalent to the high molecular compound may be used singly or in any combination of two or more thereof.

Examples of a monomer unit functioning as a skeleton of each of the monomer units having the first anionic group(s) and/or the second anionic group(s) include aliphatic vinyl monomers such as ethylene and propylene; aromatic vinyl monomers such as styrene; and diene monomer units such as butadiene and isoprene.

The polymer (c2) may be a homopolymer or a copolymer. The copolymer as the polymer (c2) may include not only the monomer units each having the first anionic group(s) and the second anionic group(s) but also monomer units each having the first anionic group(s), monomer units each having the second anionic group(s) and/or other copolymerizable monomer units. The copolymer (c1) may further include other copolymerizable monomer units.

In the copolymer, examples of the other copolymerizable monomers include monomers each having the first anionic group(s), monomers each having the second anionic group(s), aliphatic vinyl monomers such as ethylene and propylene, aromatic monomers such as styrene, and diene monomers such as butadiene and isoprene. The other copolymerizable monomers may be used singly or in any combination of two or more thereof.

Examples of the monomers each having one or more sulfonate groups as the first anionic group(s) include vinyl monomers each having one or more sulfonate groups; and diene monomers each having one or more sulfonate groups, such as isoprenesulfonic acid. Examples of the vinyl monomers each having the sulfonate group(s) include aliphatic vinyl monomers each having the sulfonate group(s), such as vinylsulfonic acid, and allylsulfonic acid; and aromatic vinyl monomers each having the sulfonate group(s), such as styrenesulfonic acid. The monomers each having the sulfonate group(s) may be used singly or in any combination of two or more thereof.

Examples of the monomers each having one or more carboxyl groups as the second anionic group(s) include acrylic acid, methacrylic acid, maleic acid, fumaric acid and carboxystyrene. The monomers each having the carboxyl group(s) may be used singly or in any combination of two or more thereof. Examples of the monomers each having one or more hydroxyl groups as the second anionic group(s) include aromatic vinyl monomers each having one or more hydroxyl groups, such as vinylphenol and hydroxylvinyltoluene. The monomers each having the hydroxyl group(s) may be used singly or in any combination of two or more thereof.

Examples of the monomers each having one or more sulfonate groups as the first anionic group(s) and one or more carboxyl groups as the second anionic group(s) include aromatic vinyl monomers each having one or more sulfonate groups and one or more carboxyl groups, such as vinylsulfobenzoic acid. Such monomers may be used singly or in any combination of two or more thereof. One of the monomer units each having one or more phosphate groups as the first anionic group(s) and one or more carboxyl groups as the second anionic group(s) is, for example, 2-(dihydroxyphosphinyloxy)acrylic acid. Examples of the monomers each having one or more phosphonate groups and one or more carboxyl groups as the second anionic groups include phosphonoacrylic acid, and 2-methyl-3-phosphonoacrylic acid.

High molecular compounds as described above may be used singly or in any combination of two or more thereof. In the high molecular compounds, their first anionic group(s) is/are preferably one or more sulfonate groups. Their second anionic group(s) may contain one or more carboxyl groups and/or one or more hydroxyl groups. This case makes it possible to heighten an effect of restraining the anode body from being corroded while keeping the dissociatability and the solubility of the cation agent certainly. Thus, the leakage current can be more effectively restrained. The second anionic group(s) may contain one or more phosphate groups and/or one or more phosphonate groups. This case makes the electrolytic capacitor high in voltage resistant property.

Third anion agents equivalent to the above-mentioned third anion agent may be used singly or in any combination of two or more thereof. The high molecular compound and the monomer compound may be used combined with each other. The third anion agents may each be used in the state of being combined with the first anion agent and/or the second anion agent, as required.

In the intermediate layer (or the treating liquid for forming the intermediate layer), the total of the number of the first anionic group(s) and the number of the second anionic group(s) is made larger than the number of the cationic group(s). This matter makes it possible to restrain the cation agent from volatilizing. This total number of the first anionic group(s) and the second anionic group(s) is equal to or more than the number of the cationic group(s), and is, for example, 1.1 times or more, or 1.2 times or more the number of the cationic group(s). The total number of the first anionic group(s) and the second anionic group(s) is, for example, 10 times or less, 5 times or less, or 3 times or less the number of the cationic group(s). Any one of these lower limits may be combined with any one of these upper values at will. The total number of the first anionic group(s) and the second anionic group(s) may be larger than once the number of the cationic group(s), and 5 times or less the number; larger than once the number of the cationic group(s), and 3 times or less the number; from 1.1 to 5 times the number; or from 1.1 to 3 times the number. When a relationship between the total number of the first anionic group(s) and the second anionic group(s) and the number of the cationic group(s) is in such a scope, a further enhancement can be attained in the formability and/or the covering performance of the second conductive polymer layer, and in the voltage resistant property.

The ratio of the number of the first anionic group(s) and/or the second anionic group(s) to the number of the cationic group(s) can be calculated out from the number of the first anionic group(s) and/or the second anionic group(s) per molecule of the used anion agent, the number of the cationic group(s) per molecule of the cation agent, the ratio by mole between the anion agent and the cation agent, and others. In the embodiments in the present disclosure, the ratio of the number of the first anionic group(s) and/or the second anionic group(s) to the number of the cationic group(s) in the intermediate layer may be substantially equal to the same ratio in the treating liquid for forming the intermediate layer since the volatilization of the cationic group(s) can be restrained.

In the intermediate layer (or the treating liquid for forming the intermediate layer), the number of the second anionic group(s) may be, for example, 0.5 times or more, 0.8 times or more, or once the number of the first anionic group(s). In order that a further enhancement can be made in the effect of restraining the corrosion of the anode body while keeping the dissociatability and the solubility of the cation agent certainly, the number of the second anionic group(s) is preferably larger than that of the first anionic group(s). The number of the second anionic group(s) is larger than that of the first anionic group(s), and may be, for example, 1.2 times or more, 1.5 times or more, or 2 times or more that of the first anionic group(s). The number of the second anionic group(s) is, for example, 10 times or less, preferably 6 times or less, more preferably 4 times or less, and may be 3 times or less, or 2.5 times or less that of the first anionic group(s). Any one of these lower limit values may be combined with any one of these upper limit values at will. The number of the second anionic group(s) may be, for example, from 0.5 times to 10 times both inclusive, from 0.8 times to 6 times both inclusive, from once (not inclusive) to 10 times (inclusive), from 1.5 times to 6 times both inclusive, from 1.5 times to 4 times both inclusive, from 1.5 times to 3 times both inclusive, or from 1.8 times to 3 times both inclusive. When the relationship between the number of the second anionic group(s) and that of the first anionic group(s) is in such a scope, balance can easily be taken between the dissociatability and solubility of the cation agent, and the effect of the restraint of the corrosion of the anode body.

In the intermediate layer (or the treating liquid for forming the intermediate layer), the number of the first anionic group(s) and that of the second anionic group(s) are each not limited to the number of the group(s) originating from the first to the third anion agents, and denote, respectively, the number of all the first anionic group(s) contained in the intermediate layer (or the treating liquid for forming the intermediate layer), and the number of all the second group(s) contained in the same.

The ratio of the number of the second anionic group(s) to that of the first anionic group(s) can be calculated out from the number of the first anionic group(s) and/or the second anionic group(s) per molecule of the used anion agent, and others. When a plurality of the anion agents are used, the ratio can be calculated from the ratio by mole between these agents, and others. In the intermediate layer, the ratio of the number of the second anionic group(s) to that of the first anionic group(s) is substantially equal to the same ratio in the treating liquid for forming the intermediate layer.

<Second Conductive Polymer Layer>

It is sufficient for the second conductive polymer layer to be formed to cover at least a part of the first conductive polymer layer. This second conductive polymer layer may be formed to cover the whole of one or more surfaces of the first conductive polymer layer. In at least one region of the surface(s) of the first conductive polymer layer, the second conductive polymer layer is formed to cover the first conductive polymer layer to interlay the intermediate layer between these layers. However, a region of the electrolytic capacitor may be present where the second conductive polymer layer is formed directly on the surface(s) of the first conductive polymer layer without interlaying the intermediate layer between these layers. Moreover, in a region of the electrolytic capacitor where the first conductive polymer layer and the intermediate layer are not formed, the second conductive polymer layer may contact the dielectric layer (in other words, the second conductive polymer layer may be formed to cover the dielectric layer).

The second conductive polymer layer includes a second conductive polymer. The second conductive polymer layer may further include a dopant. The dopant may be included in the second conductive polymer layer in a state that this layer is doped with the dopant. The dopant may also be included in a state that the dopant is bonded to the second conductive polymer.

<Second Conductive Polymer>

The second conductive polymer may be a known conductive polymer usable for an electrolytic capacitor. Specifically, this polymer is appropriately selectable from the conductive polymers given as the examples about the first conductive polymer layer. The weight-average molecular weight of the second conductive polymer layer is also appropriately selectable from the ranges given as the examples about the first conductive polymer layer. The first conductive polymer layer may be the same as or different from the second conductive polymer layer.

The second conductive polymer layer further includes a dopant. The dopant may be a known dopant usable for an electrolytic capacitor. Specifically, the dopant is appropriately selectable from the dopants given as the examples about the first conductive polymer layer. The dopant in the first conductive polymer layer may be the same as or different from the dopant in the second conductive polymer layer.

The amount of the dopant contained in the second conductive polymer layer is preferably from 10 parts by mass to 1000 parts by mass both inclusive, more preferably from 50 parts by mass to 200 parts by mass both inclusive with respect to 100 parts by mass of the second conductive polymer.

The average thickness of the second conductive polymer layer is, for example, from 5 µm to 100 µm both inclusive, preferably from 10 µm to 50 µm both inclusive. When the average thickness is in such a range, the second conductive polymer layer can be made higher in strength.

The ratio of the average thickness of the second conductive polymer layer to that of the first conductive polymer layer is, for example, 5 times or more, preferably 10 times or more. When the ratio between the average thicknesses is in such a range, the strength can be heightened.

In the exemplary embodiment described just above, the description has been made about the case in which a capacitor element has two conductive polymer layers of a first conductive polymer layer and a second conductive polymer layer. However, the capacitor element may have three or more conductive polymer layers. In this case, one or more conductive polymer layers may be formed between the first conductive polymer layer and the second conductive polymer layer.

As required, the first and second conductive polymer layers may each further include known additives, and/or one or more known conductive materials (for example, a conductive inorganic material such as manganese dioxide, and/or a TCNQ complex salt). Between the dielectric layer and the first conductive polymer layer, for example, a layer for heightening adhesiveness between these layers may be interlaid.

<<Method for Producing Electrolytic Capacitor>>

A method according to an exemplary embodiment in the present disclosure, for producing an electrolytic capacitor, includes a first step of preparing an anode body; a second step of forming a dielectric layer on the anode body; a third step of treating the anode body, in which the dielectric layer is formed, with a first treating liquid including a first conductive polymer; a fourth step of treating the anode body, which is treated with the first treating liquid, with a second treating liquid including a cation agent containing a cationic group, and an anion agent containing a first anionic group and a second anionic group; and a fifth step of treating the anode body, which is treated with the second treating liquid, with a third treating liquid including a second conductive polymer. The first anionic group is higher in electron-withdrawing property than the second anionic group; and a total of a number of the first anionic group(s) and a number of the second anionic group(s) is larger than a number of the cationic group(s). Hereinafter, each of the steps will be described in more detail.

<First Step>

In the first step, an anode body is formed by a known method in accordance with the types of the anode body. The anode body can be prepared, for example, by roughening one or more surfaces of a foil-piece or plate shape substrate made of a conductive material. In the roughening of the surface(s), it is sufficient for irregularities to be made in the surface(s) of the substrate. The roughening may be attained, for example, by etching (for example, electro-etching) the surface(s) of the substrate, or by depositing conductive material particles onto the substrate surface(s), using a gas phase method, such as vapor deposition.

<Second Step>

In the second step, a dielectric layer is formed on the anode body. The dielectric layer is formed by anodizing one or more surfaces of the anode body. The anodization can be performed by a known treatment such as anodizing treatment. The anodizing treatment can be conducted, for example, by immersing the anode body into a anodizing liquid to impregnate the surface(s) (including inner wall surfaces of holes and pits made in the surface(s)) of the anode body with the anodizing liquid; and then applying a voltage to the anode body as an anode, and a cathode immersed in the anodizing liquid across these electrodes. The anodizing liquid is preferably, for example, an aqueous phosphoric acid solution, an aqueous ammonium phosphate solution, or an aqueous ammonium adipate solution.

<Third Step>

In the third step, for example, the anode body, in which the dielectric layer is formed, is immersed into a first treating liquid, or a first treating liquid is poured into the anode body, in which the dielectric layer is formed. By the immersion or the pouring, the surface(s) (including dielectric-layer-formed inner wall surfaces of the holes and the pits made in the surface(s)) of the anode body is/are impregnated with the first treating liquid. After the impregnation with the first treating liquid, the anode body may be dried, as required. At the time of the drying, the anode body may be heated, as required. Through the third step, a first conductive polymer (and a dopant) can be caused to adhere onto the surface(s) of the dielectric-layer-formed anode body.

The first conductive polymer (and the dopant) may adhere in a coat form onto the surface(s) of the dielectric-layer-formed anode body to form a first conductive polymer layer. The first conductive polymer layer may be a coat (or coating film) formed by bringing the dielectric-layer-formed anode body into contact with the first treating liquid, and then drying. The first treating liquid may be brought into contact with the surface(s) of the dielectric-layer-formed anode body, using a coating method that may be of various types (for example, a dip coating method or a spray coating method), or using, for example, a printing method or a combination of two or more of these methods.

The first treating liquid which contains the first conductive polymer is, for example, a solution containing a solvent and the first conductive polymer, or a liquid dispersion containing a dispersing medium and a dispersoid (or dispersion phase) of the first conductive polymer dispersed in this dispersing medium. When this solution or liquid dispersion is used as the first treating liquid, the first conductive polymer layer can easily be formed. With a stable quality, this first conductive polymer layer is easily obtained. It is particularly preferred to use the liquid dispersion. The form of the dispersoid in the liquid dispersion is not particularly limited. The form may be in a fibrous form, and is preferably in a particulate (or powdery) form. The average particle size of the dispersoid particles in the liquid dispersion is preferably from 5 nm to 100 nm both inclusive. The average particle size can be obtained from, e.g., a particle size distribution of the particles that is measured by a dynamic light scattering method.

The solvent or dispersing medium contained in the first treating liquid may be, for example, water, an organic solvent, or a mixture of these liquids. Examples of the organic medium include aliphatic alcohols having 1 to 5 carbon atoms (for example, aliphatic monools such as methanol, ethanol, propanol, and 1-butanol; and aliphatic polyols such as ethylene glycol and glycerin); aliphatic ketones such as acetone; nitriles such as acetonitrile and benzonitrile; amides such as N,N-dimethylformamide; and sulfoxides such as dimethylsulfoxide. As required, the first treating liquid may contain, out of the above-mentioned constituent components of the first conductive polymer layer, components (for example, the above-mentioned dopant) other than the first conductive polymer.

In the third step, the anode body, in which the dielectric layer is formed, may be impregnated with the first treating liquid containing one or more raw materials for the first conductive polymer, and then the raw material(s) is/are polymerized (chemically polymerized or electrolytically polymerized) to form a polymerized film to cause the first conductive polymer to adhere to the anode body. The raw material(s) for the first conductive polymer is/are, for example, one or more precursors of the first conductive polymer, such as one or more monomers from which the first conductive polymer is made, and/or one or more oligomers in which units of the monomer(s) are connected to each other.

For the formation of the polymerized film, an oxidizer is used to polymerize the raw material(s) for the first conductive polymer. The oxidizer may be added to the first treating liquid. The oxidizer may be applied onto the anode body before or after the dielectric-layer-formed anode body is immersed into the first treating liquid. This oxidizer is, for example, a metal sulfonate. The metal sulfonate has a function as a dopant as well as a function as the oxidizer. Examples of a sulfonic-acid-constituting moiety of the metal sulfonate include alkylsulfonic acids and aromatic sulfonic acids (such as benzenesulfonic acid, toluenesulfonic acid, and naphthalenesulfonic acid). Examples of a metal moiety constituting the metal salt include iron (III), copper (II), chromium (IV), and/or zinc (II).

The first treating liquid used to form the polymerized film may contain a solvent. The solvent is appropriately selectable from the solvents given as the examples about the first treating liquid used to form the above-mentioned coat (coating film). As required, the first treating liquid used to form the polymerized film may contain, out of the above-mentioned constituent components of the first conductive polymer layer, components (for example, the above-mentioned dopant) other than (the raw material(s) for) the first conductive polymer.

<Fourth Step>

The fourth step can be performed, for example, by bringing a second treating liquid containing a cation agent and an anion agent into contact with the anode body treated with the first treating liquid. After the contact with the second treating liquid, the anode body may be dried as required. At the time of the drying, the anode body may be heated as required.

The second treating liquid may contain a solvent as well as the cation agent and the anion agent. The solvent may be, for example, water, an organic solvent, or a mixture of these liquids. Examples of the organic medium include aliphatic alcohols having 1 to 5 carbon atoms (for example, aliphatic monools such as methanol, ethanol, propanol, and 1-butanol; and aliphatic polyols such as ethylene glycol and glycerin); aliphatic ketones such as acetone; nitriles such as acetonitrile and benzonitrile; amides such as N,N-dimethylformamide; and/or sulfoxides such as dimethylsulfoxide.

The solvent preferably contains at least water. The proportion of the organic solvent in the whole of the solvent is preferably 15% or less by mass, more preferably 10% or less by mass, 5% or less by mass. It is preferred to set the concentration of the organic solvent contained in the second treating liquid into 5% or less by mass of the whole of the solvent. When the proportion of the organic solvent is in such a range, a change can be restrained in the organic solvent concentration with time by the volatilization of this solvent in a production process of the electrolytic capacitor. This matter makes it easy to restrain the volatilization of the cation agent, which follows the removal of the organic solvent, and an increase in the ESR, which follows the remaining of the organic solvent. When the solvent contains an organic solvent higher in boiling point than water, enhancements are made in the effects of restraining the volatilization of the cation agent, which follows the removal of the organic solvent, and of restraining the increase in the ESR, which follows the remaining of the organic solvent, by setting the proportion of the organic solvent into any one of the above-mentioned ranges.

The ratio of the total number of the first anionic group(s) and the second anionic group(s) to the number of the cationic group(s) is adjustable by adjusting the respective species of the anion agent and the cation agent, the respective compositions of the anion agent and the cation agent, and/or the ratio by mole between the anion agent and the cation agent in the second treating liquid. The ratio of the number of the first anionic group(s) to that of the second anionic group(s) is also adjustable by adjusting the composition of the anion agent.

In the fourth step, it is preferred that the cation agent and the anion agent adhere to cover the first conductive polymer (and the dopant) adhering to the surface(s) of the dielectric layer. These agents may adhere in a coat form thereto to form an intermediate layer.

<Fifth Step>

The fifth step can be performed in a manner identical with or similar to the manner used in the third step except that the anode body treated with the second treating liquid is used and further instead of the first treating liquid, a third treating liquid containing a second conductive polymer (and an optional dopant) is used. The third treating liquid may be a liquid identical with the first treating liquid except that instead of the first conductive polymer, the second conductive polymer is contained in this liquid.

<Step of Forming Cathode Layer>

The method for producing the electrolytic capacitor may further include a (sixth) step of forming a cathode layer. In the sixth step, a carbon layer and a silver paste layer are successively formed onto the surface(s) of (preferably the second conductive polymer layer of) the anode body yielded through the fifth step.

The carbon layer can be formed by immersing the anode body having the second-conductive-polymer-layer-formed dielectric layer into an aqueous liquid dispersion of carbon (for example, a conductive carbon material such as graphite), or by applying a carbon paste onto the surface(s) of the second conductive polymer layer. The carbon paste is a composition including a conductive carbon material such as graphite. The thickness of the carbon layer is, for example, from 1 µm to 20 µm both inclusive.

The silver paste is a composition including silver particles and a resin (binder resin). The resin may be a thermoplastic resin, and is preferably a thermosetting resin. The thickness of the silver paste is, for example, from 50 µm to 100 µm both inclusive. The structure of the cathode layer is not limited to this examples, and may be any structure having a current-collecting function.

EXAMPLES

Hereinafter, the present disclosure will be specifically made by way of examples and comparative examples. However, the technique according to the present disclosure is not limited to the examples.

Example 1

Electrolytic capacitor 1 illustrated in FIG. 1 was produced, and properties thereof were evaluated in the following manners:

(1) Step of Preparing Anode Body 2 (First Step)

Both surfaces of an aluminum foil piece (thickness: 100 µm) as a substrate were etched to be roughened. In this way, anode body 2 was produced.

(2) Step of Forming Dielectric Layer 3 (Second Step)

A one-end-portion-side region of anode body 2 (region from a separation portion of anode body 2 to the one end portion thereof) was immersed in an anodizing liquid, and a DC voltage of 70 V was applied thereto for 20 minutes to form dielectric layer 3 including aluminum oxide.

(3) Step of Forming First Conductive Polymer Layer 4a (Third Step)

A 3,4-ethylenedioxythiophene monomer was added to an aqueous solution of polystyrenesulfonic acid (weight-average molecular weight: 75,000) while the solution was stirred. Next, oxidizers (iron (III) sulfate and sodium persulfate) were added thereto to conduct a chemical oxidization polymerization. The resultant polymer liquid was filtrated through an ion exchange device to remove impurities to yield a solution containing poly-3,4-ethyleneclioxythiophene (PEDOT) as a first conductive polymer, and a polystyrenesulfonic acid (PSS) as a dopant.

Pure water was added to the resultant solution, and a high-pressure homogenizer was used to homogenize the solution. Furthermore, the solution was filtrated through a filter to prepare a first treating liquid in a liquid dispersion form. Anode body 2, on which dielectric layer 3 is formed in the second step (item (2)), was immersed into the first treating liquid, and then taken from the first treating liquid. Furthermore, the workpiece was dried at 120° C. for 10 to 30 minutes. Each of the immersion into the first treating liquid and the drying was further repeated once to form first conductive polymer layer 4a to cover surfaces of dielectric layer 3. The average thickness of first conductive polymer layer 4a was measured through a scanning electron microscope (SEM). As a result, the thickness of first conductive polymer layer 4a was about 1 µm.

(4) Step of Forming Intermediate Layer 4c (Fourth Step)

A second treating liquid was prepared by dissolving N,N-dimethyloctylamine (cation agent) and sulfophthalic acid (anion agent) into pure water. The concentration of the cation agent and that of the anion agent in the second treating liquid were set to 0.05 mol/L and 0.025 mol/L, respectively. A total of a number of the sulfonate groups as the first anionic groups and a number of carboxyl groups as the second anionic groups was 1.5 times a number of tertiary amino groups as the cationic groups. The ratio of the number of the second anionic groups to that of the first anionic groups was 2 times.

Anode body 2 treated in the third step (item (3)) was immersed into the second treating liquid, and then taken out. Furthermore, this workpiece was dried at 100° C. for 3 minutes to form intermediate layer 4c to cover surfaces of first conductive polymer layer 4a. In the intermediate layer, the ratio of the total number of the first anionic groups and the second anionic groups with respect to the number of the cationic groups was substantially equal to the corresponding ratio in the second treating liquid, and the ratio between the number of the first anionic groups and that of the second anionic groups was substantially equal to the corresponding ratio in the second treating liquid.

(5) Step of Forming Second Conductive Polymer Layer 4b (Fifth Step)

A third treating liquid, which had the same composition as the first treating liquid used in the third step (item (3)), was used. Anode body 2 treated in the fourth step (item (4)) was immersed into the third treating liquid, taken out, and then further dried at 120° C. for 10 to 30 minutes. The immersion into the third treating liquid and the drying were further alternately repeated two times to form second conductive polymer layer 4b to cover surfaces of the intermediate layer 4c. In the same way as used in the case of first conductive polymer layer 4a, the average thickness of second conductive polymer layer 4b was measured. As a result, the thickness was about 30 µm. In this way, first conductive polymer layer 4a, intermediate layer 4c and second conductive polymer layer 4b were formed to cover the surfaces of dielectric layer 3.

(6) Step of Forming Cathode Layer 5 (Sixth Step)

Anode body 2 yielded in the fifth step (item (5)) was immersed in a liquid dispersion in which graphite particles were dispersed in water, taken out from the liquid dispersion, and then dried to form carbon layer 5a at least on surfaces of second conductive polymer layer 4b. The drying was performed at a temperature from 130° C. to 180° C. both inclusive for a period from 10 minutes to 30 minutes both inclusive. Next, a silver paste containing silver particles and a binder resin (epoxy resin) was applied onto surfaces of carbon layer 5a, and then the workpiece was heated at a temperature from 150° C. to 200° C. both inclusive for a period from 10 minutes to 60 minutes both inclusive to cure the binder resin to form silver paste layer 5b. In this way, cathode layer 5 was formed, which was composed of carbon layer 5a and silver paste layer 5b. As described above, capacitor element 11 was produced.

(7) Fabrication of Electrolytic Capacitor

Cathode layer 5 of capacitor element 11 yielded in the sixth step (item (6)) was joined with one end portion 14a (first end portion) of cathode terminal 14 through conductive adhesive 17. A end portion of anode body 2 which is projected from capacitor element 11 was joined with one end portion 13a (first end portion) of anode terminal 13 by laser welding. Next, a transfer molding method was used to form resin outer package 12 made of an insulating resin around capacitor element 11. At this time, the other end portion 13b (second end portion) of anode terminal 13 and the other end portion 14b (second end portion) of cathode terminal 14 were made into a state of being pulled out from resin outer package 12. In this way, electrolytic capacitor 1 (A1) was completed. In the same way as described above, electrolytic capacitors 1 in a total number of 250 were produced.

(8) Evaluation

The electrolytic capacitors were used to make the following evaluations:

(a) ESR

The electrolytic capacitors in a number of 120 were selected at random, and then a four-terminal-measuring LCR meter was used to measure the ESR value (mΩ) of each of the electrolytic capacitors at a frequency of 100 kHz. The average value of the measured values was calculated out.

(b) Leakage Current

A resistor having a resistance of 1 kΩ was connected in series to each of the electrolytic capacitors, and a DC power source was used to apply a constant voltage of 25 V to the electrolytic capacitor for 1 minute. Thereafter, a leakage current (µA) of the capacitor was measured. The average value of the measured values of the 250 electrolytic capacitors was calculated out.

Examples 2 to 6, and Comparative Example 1

Electrolytic capacitors A2, as well as electrolytic capacitors A3 to A6, and B1 (Comparative Example 1), were produced in the same way as in Example 1 except that in the fourth step, the concentration of the anion agent in the second treating liquid (or the intermediate layer) was changed to set the following ratio to one value shown in Table 1: the ratio of the total number of the first anionic groups and the second anionic groups with respect to the number of the cationic groups in the second treating liquid. These electrolytic capacitors were evaluated in the same way as in Example 1.

Example 7

Electrolytic capacitors (A7) were produced and evaluated in the same way as in Example 1 except that sulfosalicylic acid was used instead of sulfophthalic acid.

Comparative Example 2

Electrolytic capacitors (B2) were produced and evaluated in the same way as in Comparative Example 1 except that sulfosalicylic acid was used instead of sulfophthalic acid.

In Table 1 are shown the evaluation results of Examples 1 to 7 and Comparative Examples 1 and 2. A1 to A7 are electrolytic capacitors of the Examples, and B1 and B2 are electrolytic capacitors of the Comparative Examples.

agent from their second treating liquid was restrained so that the second conductive polymer layer was improved in formability and/or covering performance.

Example 8

Electrolytic capacitors (A8) were produced and evaluated in the same way as in Example 1 except that instead of sulfophthalic acid, benzenesulfonic acid (first anion agent) and phthalic acid (second anion agent) were used, and further about the anion agent concentration in the second treating liquid, the concentration of the first anion agent and that of the second anion agent were changed to 0.025 mol/L and 0.025 mol/L, respectively.

Example 9

Electrolytic capacitors (A9) were produced and evaluated in the same way as in Example 1 except that instead of sulfophthalic acid, benzenesulfonic acid (first anion agent) and salicylic acid (second anion agent) were used, and further about the anion agent concentration in the second treating liquid, the concentration of the first anion agent and

TABLE 1

|  | Cation |  | Anion |  | "Number of anionic groups"/ "number of cationic groups" | Evaluation results |  |
|---|---|---|---|---|---|---|---|
|  | Cation agent | Concentration [mol/L] | Anion agent | Concentration [mol/L] |  | ESR [mΩ] | Leakage current [μA] |
| A1 | N,N-dimethyl octylamine | 0.05 | Sulfophthalic acids | 0.0250 | 1.5 | 24 | 1.0 |
| A2 | N,N-dimethyl octylamine | 0.05 | Sulfophthalic acids | 0.0185 | 1.1 | 25 | 1.3 |
| A3 | N,N-dimethyl octylamine | 0.05 | Sulfophthalic acids | 0.0200 | 1.2 | 24 | 2.5 |
| A4 | N,N-dimethyl octylamine | 0.05 | Sulfophthalic acids | 0.0335 | 2.0 | 27 | 1.9 |
| A5 | N,N-dimethyl octylamine | 0.05 | Sulfophthalic acids | 0.0500 | 3.0 | 30 | 1.0 |
| A6 | N,N-dimethyl octylamine | 0.05 | Sulfophthalic acids | 0.0835 | 5.0 | 53 | 6.9 |
| A7 | N,N-dimethyl octylamine | 0.05 | Sulfosalicylic acid | 0.0250 | 1.5 | 52 | 2.2 |
| B1 | N,N-dimethyl octylamine | 0.05 | Sulfophthalic acids | 0.0100 | 0.6 | 72 | 69.0 |
| B2 | N,N-dimethyl octylamine | 0.05 | Sulfosalicylic acid | 0.0100 | 0.6 | 83 | 122.0 |

As shown in Table 1, in Comparative Example 1, in which the number of the anionic groups (total number of the first anionic groups and the second anionic groups) was smaller than the number of the cationic groups in the intermediate layer, the ESR value was large and the leakage current was increased in quantity. In Comparative Example 2, in which sulfosalicylic acid was used as the anion agent, the ESR value became even larger and the leakage current became remarkably larger than in Comparative Example 1. In contrast, the Examples, in which the number of the anionic groups was larger than that of the cationic groups, the ESR value and the leakage current value were remarkably lowered as compared with Comparative Examples 1 and 2. It can be considered that these results were based on a matter that in the working examples, the volatilization of the cation that of the second anion agent were changed to 0.025 mol/L and 0.025 mol/L, respectively.

Comparative Example 3

Electrolytic capacitors (B3) were produced in the same way as in Example 8 except that about the anion agent concentration in the second treating liquid, the concentration of the first anion agent and that of the second anion agent in the second treating liquid were changed to set the ratio of the number of the anionic groups to that of the cationic groups in the second treating liquid to 0.60. The electrolytic capacitors were then evaluated in the same way as in Example 1. In Table 2 are shown the evaluation results of Examples 8 and 9, and Comparative Example 3.

TABLE 2

| | Cation agent | Cation Concentration [mol/L] | First anion agent | Concentration [mol/L] | Second anion agent | Concentration [mol/L] | "Number of anionic groups"/ "number of cationic groups" | Evaluation results ESR [mΩ] | Leakage current [µA] |
|---|---|---|---|---|---|---|---|---|---|
| A8 | N,N-dimethyl octylamine | 0.05 | Benzene sulfonic acid | 0.0250 | Phthalic acid | 0.0250 | 1.5 | 27 | 1.1 |
| A9 | N,N-dimethyl octylamine | 0.05 | Benzene sulfonic acid | 0.0250 | Salicylic acid | 0.0250 | 1.5 | 25 | 1.8 |
| B3 | N,N-dimethyl octylamine | 0.05 | Benzene sulfonic acid | 0.0100 | Phthalic acid | 0.0100 | 0.6 | 66 | 53.3 |

As shown in Table 2, also in the case of using, as anion agents, the first anion agent having first anionic groups (sulfonate groups) and the second anion agent having second anionic groups (carboxyl groups, or carboxyl groups and hydroxyl groups, the ESR value and the leakage current value were largely decreased (the electrolytic capacitors A8 and A9) in the same way as in Example 1. In contrast, in the electrolytic capacitors B3, in which the number of the anionic groups was smaller than that of the cationic groups, even by the use of the first anion agent and the second anion agent, both of the ESR value and the leakage current value were largely increased from those in the Examples.

Examples 10 to 12

Electrolytic capacitors A10, as well as electrolytic capacitors A11 and A12, were produced and evaluated in the same way as in Example 1 except that benzenesulfonic acid (first anion agent) and a second anion agent shown in Table 3 were used instead of sulfophthalic acid.

Comparative Example 4

Electrolytic capacitors (B4) were produced in the same way as in Example 10 except that about the anion agent concentration in the second treating liquid, the concentration of the first anion agent and that of the second anion agent in the second treating liquid were changed to set the ratio of the number of the anionic groups to that of the cationic groups in the second treating liquid to 0.60. The electrolytic capacitors were then evaluated in the same way as in Example 1.

Comparative Example 5

Electrolytic capacitors (B5) were produced in the same way as in Example 11 except that about the anion agent concentration in the second treating liquid, the concentration of the first anion agent and that of the second anion agent in the second treating liquid were changed to set the ratio of the number of the anionic groups to that of the cationic groups in the second treating liquid to 0.60. The electrolytic capacitors were then evaluated in the same way as in Example 1. In Table 3 are shown the evaluation results of Examples 10 to 12, and Comparative Examples 4 and 5. For reference, acid phosphoxy ethyl acrylate is represented by $P(=O)(OH)_2-O-CH_2CH_2-O-C(=O)-CH=CH_2$; and acid phosphoxy ethyl methacrylate, by $P(=O)(OH)_2-O-CH_2CH_2-O-C(=O)-C(CH_3)=CH_2$.

TABLE 3

| | Cation agent | Cation Concentration [mol/L] | First anion agent | Concentration [mol/L] | Second anion agent | Concentration [mol/L] | "Number of anionic groups"/ "number of cationic groups" | Evaluation results ESR [mΩ] | Leakage current [µA] |
|---|---|---|---|---|---|---|---|---|---|
| A10 | N,N-dimethyl octylamine | 0.05 | Benzene sulfonic acid | 0.0250 | Acid phosphoxy ethyl acrylate | 0.0500 | 1.5 | 27 | 0.1 |
| A11 | N,N-dimethyl octylamine | 0.05 | Benzene sulfonic acid | 0.0250 | Acid phosphoxy ethyl methacrylate | 0.0500 | 1.5 | 33 | 0.1 |
| A12 | N,N-dimethyl octylamine | 0.05 | Benzene sulfonic acid | 0.0250 | Vinyl phosphonic acid | 0.0500 | 1.5 | 32 | 0.5 |
| B4 | N,N-dimethyl octylamine | 0.05 | Benzene sulfonic acid | 0.0150 | Acid phosphoxy ethyl acrylate | 0.0150 | 0.6 | 77 | 33.5 |

TABLE 3-continued

| | Cation | | Anion | | | | "Number of anionic groups"/ | Evaluation results | |
|---|---|---|---|---|---|---|---|---|---|
| | | | First | | Second | | | | Leakage |
| | Cation agent | Concentration [mol/L] | anion agent | Concentration [mol/L] | anion agent | Concentration [mol/L] | "number of cationic groups" | ESR [mΩ] | current [μA] |
| B5 | N,N-dimethyl octylamine | 0.05 | Benzene sulfonic acid | 0.0150 | Acid phosphoxy ethyl methacrylate | 0.0150 | 0.6 | 91 | 50.1 |

As shown in Table 3, also in the case of using, as anion agents, the first anion agent having first anionic groups (sulfonate groups) and the second anion agent having second anionic groups (phosphate groups), the ESR value was largely decreased (the electrolytic capacitors A10 to A12) in the same way as in Example 1. In these Examples, the leakage-current-restraining effect was particularly remarkable, and the leakage current was decreased into a value from ½ to 1/10 of that in Example 1 or Example 8, in which carboxyl groups were used as the second anionic groups.

In contrast, in the electrolytic capacitors B4 and B5, in which the number of the anionic groups was smaller than that of the cationic groups, even by the use of the same first anion agent and second anion agent as in Example 10 or Example 11, both of the ESR value and the leakage current value were largely increased from those in the Examples.

Examples 13 to 20, and Comparative Example 6

Electrolytic capacitors (A13), as well as electrolytic capacitors (A14) to (A20), and (B6), were produced in the same way as in Example 10 except that one second anion shown in Table 4 was used, and the concentration of the first anionic groups and that of the second anionic groups in the second treating liquid were each changed to one value shown in Table 4. The electrolytic capacitors were then evaluated in the same way as in Example 1. In Table 4 are shown the evaluation results of Examples 13 to 20 (Electrolytic capacitors A13 to A20), and Comparative Example 6 (Electrolytic capacitors B6). Table 4 also shows the evaluation results of Example 10.

TABLE 4

| | Cation | | Anion | | | | "Number of anionic groups"/ "number of cationic groups" | "Number of second anionic groups"/ "number of first anionic groups" | Evaluation results | |
|---|---|---|---|---|---|---|---|---|---|---|
| | Cation agent | Concentration [mol/L] | First anion agent | Concentration [mol/L] | Second anion agent | Concentration [mol/L] | | | ESR [mΩ] | Leakage current [μA] |
| A10 | N,N-dimethyl octylamine | 0.05 | Benzene sulfonic acid | 0.0250 | Acid phosphoxy ethyl acrylate | 0.0500 | 1.50 | 2.00 | 27 | 0.1 |
| A13 | N,N-dimethyl octylamine | 0.05 | Benzene sulfonic acid | 0.0150 | Acid phosphoxy ethyl acrylate | 0.0600 | 1.50 | 4.00 | 25 | 0.1 |
| A14 | N,N-dimethyl octylamine | 0.05 | Benzene sulfonic acid | 0.0110 | Acid phosphoxy ethyl acrylate | 0.0660 | 1.54 | 6.00 | 28 | 0.2 |
| A15 | N,N-dimethyl octylamine | 0.05 | Benzene sulfonic acid | 0.0375 | Acid phosphoxy ethyl acrylate | 0.0375 | 1.50 | 1.00 | 33 | 0.5 |
| A16 | N,N-dimethyl octylamine | 0.05 | Benzene sulfonic acid | 0.0400 | Acid phosphoxy ethyl methacrylate | 0.0350 | 1.50 | 0.88 | 38 | 0.4 |
| A17 | N,N-dimethyl octylamine | 0.05 | Benzene sulfonic acid | 0.0300 | Acid phosphoxy ethyl acrylate | 0.0450 | 1.50 | 1.50 | 26 | 0.1 |
| A18 | N,N-dimethyl octylamine | 0.05 | Benzene sulfonic acid | 0.0250 | Acid phosphoxy ethyl acrylate | 0.0550 | 1.60 | 2.20 | 29 | 0.1 |
| A19 | N,N-dimethyl octylamine | 0.05 | Benzene sulfonic acid | 0.0250 | Acid phosphoxy ethyl acrylate | 0.1000 | 2.50 | 4.00 | 50 | 0.3 |

TABLE 4-continued

| | Cation | | Anion | | | | "Number of anionic groups"/ "number of cationic groups" | "Number of second anionic groups"/ "number of first anionic groups" | Evaluation results | |
|---|---|---|---|---|---|---|---|---|---|---|
| | Cation agent | Concentration [mol/L] | First anion agent | Concentration [mol/L] | Second anion agent | Concentration [mol/L] | | | ESR [mΩ] | Leakage current [μA] |
| A20 | N,N-dimethyl octylamine | 0.05 | Benzene sulfonic acid | 0.0250 | Acid phosphoxy ethyl acrylate | 0.1500 | 3.50 | 6.00 | 47 | 1.0 |
| B6 | N,N-dimethyl octylamine | 0.05 | Benzene sulfonic acid | 0.0150 | Acid phosphoxy ethyl acrylate | 0.0300 | 0.90 | 2.00 | 80 | 58.0 |

As shown in Table 4, also in the case of changing the ratio of the number of the second anionic groups to that of the first anionic groups, the ESR value was decreased and the leakage-current-restraining effect was also excellent (Examples 13 to 20) in the same way as in Example 10. In contrast, in Comparative Example 6, in which the number of the anionic groups was smaller than that of the cationic groups, the ESR was increased and the leakage current was remarkably increased even when the ratio of the number of the second anionic groups to that of the first anionic groups was equivalent to that in the Examples.

The electrolytic capacitor according to the present exemplary embodiment is usable for various articles required to be decreased in ESR and be restrained from undergoing the generation of a leakage current.

What is claimed is:

1. An electrolytic capacitor comprising:
   an anode body;
   a dielectric layer formed on the anode body;
   a first conductive polymer layer covering at least a part of the dielectric layer;
   a second conductive polymer layer covering at least a part of the first conductive polymer layer; and
   an intermediate layer formed between the first conductive polymer layer and the second conductive polymer layer; wherein:
   the intermediate layer comprises a cation agent containing a cationic group, and an anion agent containing a first anionic group and a second anionic group;
   the first anionic group is a sulfonate group;
   the second anionic group is at least one of species selected from a phosphate group and a phosphonate group; and
   in the intermediate layer, a total of a number of the first anionic group and a number of the second anionic group is larger than a number of the cationic group.

2. The electrolytic capacitor according to claim 1, wherein in the intermediate layer, the number of the second anionic group is larger than the number of the first anionic group.

3. The electrolytic capacitor according to claim 2, wherein the number of the second anionic group is from 1.5 to 6 times both inclusive the number of the first anionic group.

4. The electrolytic capacitor according to claim 1, wherein the anion agent comprises a first anion agent containing the first anionic group and a second anion agent containing the second anionic group.

5. The electrolytic capacitor according to claim 1, wherein the anion agent comprises a third anion agent having the first anionic group and the second anionic group.

6. The electrolytic capacitor according to claim 1, wherein the cationic group is an amino group.

7. An electrolytic capacitor comprising:
   an anode body;
   a dielectric layer formed on the anode body;
   a first conductive polymer layer covering at least a part of the dielectric layer;
   a second conductive polymer layer covering at least a part of the first conductive polymer layer; and
   an intermediate layer formed between the first conductive polymer layer and the second conductive polymer layer; wherein:
   the intermediate layer comprises a cation agent containing a cationic group, and an anion agent containing a first anionic group and a second anionic group;
   the first anionic group is a sulfonate group; and
   the second anionic group is at least one of species selected from a phosphate group and a phosphonate group.

8. The electrolytic capacitor according to claim 7, wherein in the intermediate layer, a number of the second anionic group is larger than a number of the first anionic group.

9. The electrolytic capacitor according to claim 7, wherein a number of the second anionic group is from 1.5 to 6 times both inclusive a number of the first anionic group.

10. The electrolytic capacitor according to claim 7, wherein the anion agent comprises a first anion agent containing the first anionic group and a second anion agent containing the second anionic group.

11. The electrolytic capacitor according to claim 7, wherein the anion agent comprises a third anion agent having the first anionic group and the second anionic group.

12. The electrolytic capacitor according to claim 7, wherein the cationic group is an amino group.

13. An electrolytic capacitor comprising:
   an anode body;
   a dielectric layer formed on the anode body; and
   a conductive polymer layer covering at least a part of the dielectric layer; wherein:
   a cation agent containing a cationic group and an anion agent containing a first anionic group and a second anionic group adhere to the conductive polymer layer;
   the first anionic group is a sulfonate group; and
   the second anionic group is at least one of species selected from a phosphate group and a phosphonate group.

14. The electrolytic capacitor according to claim 13, wherein a total of a number of the first anionic group adhering to the conductive polymer layer and a number of the second anionic group adhering to the conductive polymer layer is larger than a number of the cationic group adhering to the conductive polymer layer.

15. The electrolytic capacitor according to claim 13, wherein a total of a number of the first anionic group and a number of the second anionic group is from 1.1 to 5 times both inclusive a number of the cationic group.

16. The electrolytic capacitor according to claim 13, wherein a number of the second anionic group adhering to the conductive polymer layer is larger than a number of the first anionic group adhering to the conductive polymer layer.

17. The electrolytic capacitor according to claim 13, wherein a number of the second anionic group is from 1.5 to 6 times both inclusive a number of the first anionic group.

18. The electrolytic capacitor according to claim 13, wherein the anion agent comprises a first anion agent containing the first anionic group and a second anion agent containing the second anionic group.

19. The electrolytic capacitor according to claim 13, wherein the anion agent comprises a third anion agent having the first anionic group and the second anionic group.

20. The electrolytic capacitor according to claim 13, wherein the cationic group is an amino group.

21. An electrolytic capacitor comprising:
an anode body;
a dielectric layer formed on the anode body; and
a conductive polymer layer covering at least a part of the dielectric layer; wherein:
the conductive polymer layer comprises a cation agent containing a cationic group, and an anion agent containing a first anionic group and a second anionic group;
the first anionic group is a sulfonate group; and
the second anionic group is at least one of species selected from a phosphate group and a phosphonate group.

22. The electrolytic capacitor according to claim 21, wherein a total of a number of the first anionic group contained in the conductive polymer layer and a number of the second anionic group contained in the conductive polymer layer is larger than a number of the cationic group contained in the conductive polymer layer.

23. The electrolytic capacitor according to claim 21, wherein a total of a number of the first anionic group and a number of the second anionic group is from 1.1 to 5 times both inclusive a number of the cationic group.

24. The electrolytic capacitor according to claim 21, wherein a number of the second anionic group contained in the conductive polymer layer is larger than a number of the first anionic group contained in the conductive polymer layer.

25. The electrolytic capacitor according to claim 21, wherein a number of the second anionic group is from 1.5 to 6 times both inclusive a number of the first anionic group.

26. The electrolytic capacitor according to claim 21, wherein the anion agent comprises a first anion agent containing the first anionic group and a second anion agent containing the second anionic group.

27. The electrolytic capacitor according to claim 21, wherein the anion agent comprises a third anion agent having the first anionic group and the second anionic group.

28. The electrolytic capacitor according to claim 21, wherein the cationic group is an amino group.

* * * * *